June 2, 1953 E. W. MORTIMER ET AL 2,640,700

PHONOGRAPH AND THE LIKE

Filed Sept. 30, 1947 5 Sheets-Sheet 1

Applicants
Edward Walter Mortimer
Edward William Wilkins
By [illegible]
their Attorney June 2, 1953 E. W. MORTIMER ET AL 2,640,700

PHONOGRAPH AND THE LIKE

Filed Sept. 30, 1947 5 Sheets-Sheet 2 applicant
Edward Walter Mortimer
Edward William Willis
By [illegible]
attorney

PHONOGRAPH AND THE LIKE

Filed Sept. 30, 1947

Applicants
Edward Walter Mortimer
Edward William Wilkes
by [illegible]
their attorney Applicant
Edward Walter Mortimer
Edward William Wilkes
By [signature]
their attorney Patented June 2, 1953 2,640,700

UNITED STATES PATENT OFFICE 2,640,700

PHONOGRAPH AND THE LIKE

Edmund Walter Mortimer and Edward William Wilkins, Swindon, England, assignors to The Garrard Engineering and Manufacturing Company Limited, Swindon, England Application September 30, 1947, Serial No. 777,026
In Great Britain September 4, 1946

Section 1, Public Law 690, August 8, 1946
Patent expires September 4, 1966

2 Claims. (Cl. 274—2)

This invention relates to phonographs, radiograms and the like (hereinafter referred to as phonographs) wherein the phonograph unit is enclosed within a cabinet and access to the turntable is obtained by a hinged lid, closing door, drawer or other movable part of the cabinet. For convenience the invention will be described in reference to a phonograph enclosed within a cabniet having a hinging lid.

An object of the invention is to provide an improved and simplified pick-up or tone arm (hereinafter referred to as pick-up) controlling mechanism in which the pick-up is lowered on to or raised from a record on the turntable by the closing or opening movements of the lid.

A further object is to provide resetting means for the pick-up which automatically returns the pick-up to the starting position through the opening movement of the lid.

A further object is to provide selecting means for the pick-up for playing 10" or 12" records which are automatically operated through the closing of the lid in accordance with the size of the record in place on the turntable.

Another object is to provide switch means for controlling the motor whereby switching on the motor is dependent upon a record being mounted in position on the turntable.

The invention consists in a phonograph unit enclosed or adapted to be enclosed within a cabinet having a hinging lid or displaceable opening part wherein the pick-up is mounted upon the lid or displaceable part or upon a hinging or displaceable plate co-operating with the lid, whereby on closing or opening the lid or displaceable part, or lowering or raising the plate the pick-up is lowered on to or raised from the record.

The invention also consists in a phonograph unit adapted to be enclosed within a cabinet having a hinging lid, wherein the pick-up is carried upon a hinging over-arm co-operating with the lid, whereby on closing or opening the lid, the pick-up is lowered on to or raised from the record.

The pick-up may be carried by a bearing element slidable on a tracking bar or element which is mounted on the hinging over-arm at an angle preferably a right angle to the hinging axis such that an opening the lid the pick-up automatically returns under the action of gravity to the starting position.

In the case where either 10" or 12" records are to be played, means may be provided, for automatically setting the pick-up to the 10" position and means operable by the presence of a 12" record on the turntable, for modifying the movement of said automatic means whereby the pick-up is set at 12" position.

Alternatively the pick-up may normally be reset to the 12" position and means may be provided for moving the pick-up against gravity to the position for playing a 10" record.

As a further alternative manual resetting means for the pick-up may be provided.

According to a further feature of the invention, on closing the lid, a starting switch in the circuit of the motor driving the turntable is automatically closed, and in order to prevent the motor operating when no record is in position on the turntable, a supplementary switch, in series with the starting switch, is provided which is actuated by the record. With such arrangement, means automatically actuated by the pick-up at the end of the record are provided for opening the starting switch to cut out the motor.

According to a further feature of the invention the tracking rod which guides the pick-up across the record may be inclined to provide a bias against the movement of the pick-up to minimise the amount of pull of the record groove to move the pick-up across the record.

In the accompanying drawings:

Figures 1 to 8 are views of a preferred form of phonograph unit according to the invention, Figure 1 is a plan of the unit, Figure 2 is an elevation, Figure 3 is an elevation at right angles to Figure 2, the parts being in position corresponding to a 10" record, Figure 4 is an elevation, partly in section showing the parts in position for a 12" record, Figure 5 is a part sectional elevation showing the starting switch in playing position.

Figures 1, 2:
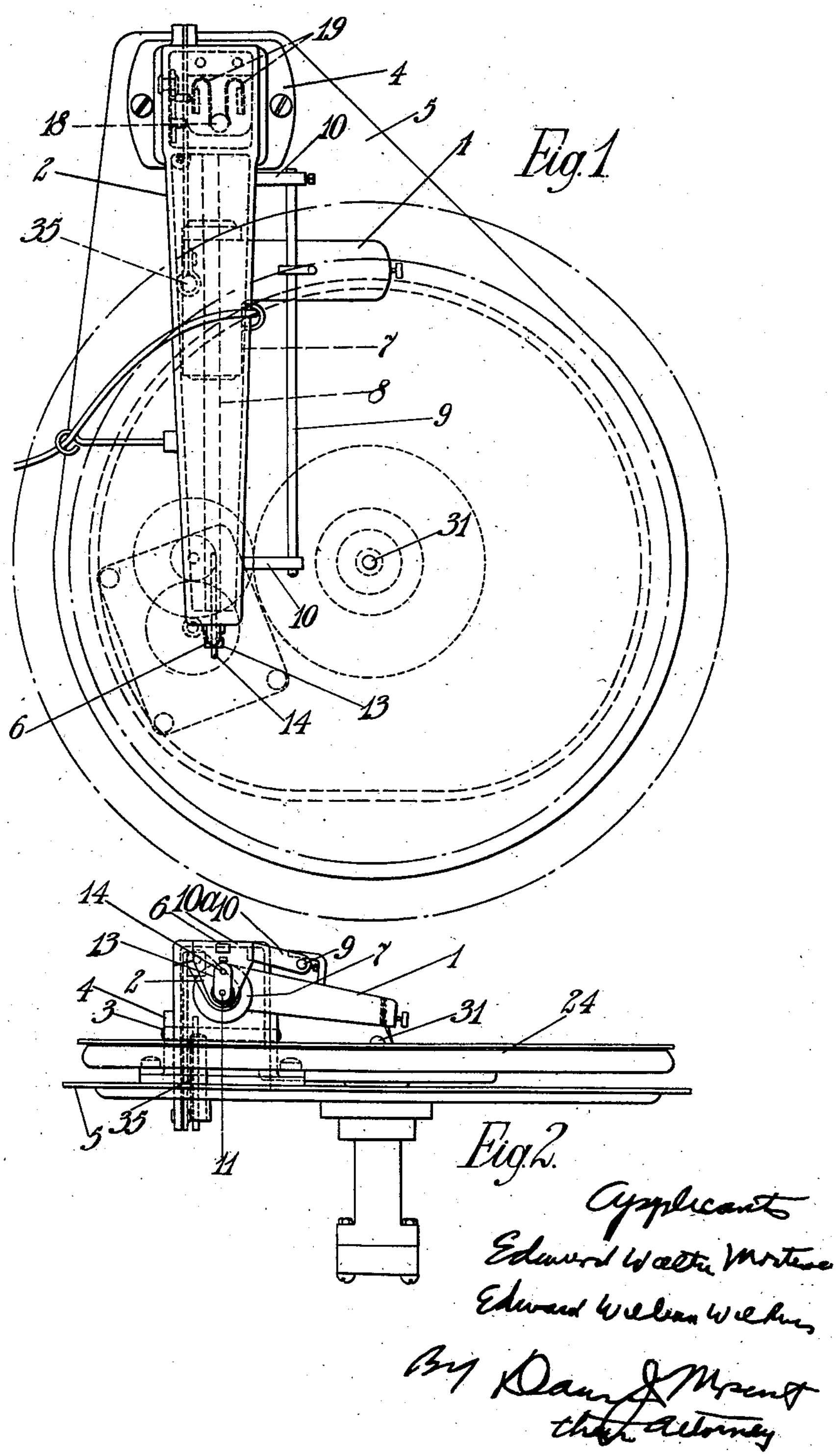

In carrying the invention into effect according to one convenient mode as applied to a self-contained unit adapted to be mounted in a cabinet having a hinged lid, the pick-up 1 is carried by an over-arm 2 which is pivoted upon a pin 3 supported by a base or bracket 4 mounted upon the motor plate 5. The plate 5 is adapted to be secured in the cabinet in any suitable manner either directly or by anti-vibration means so that the axis of the pin 3 lies parallel to the hinging axis of the lid of the cabinet. The over-arm 2 is provided with a lug 6 adapted for engagement by an abutment secured to the cabinet lid whereby the over-arm will be raised or lowered by a pivotal movement about the pin 3 as the lid is opened or closed.

The pick-up 1 is provided with a crosshead or carriage 7 which is mounted to slide upon the bar 8 which is carried by the over-arm 2, the axis of the bar being at right angles to the axis of the pin 3. The crosshead 7 may be provided with anti-friction means permitting pivotal movement of the pick-up 1 on the bar 8. A supporting rod 9 mounted in projections 10 of the over-arm 2 and lying parallel to the bar 8 supports the pick-up during its return movement as hereinafter referred to.

The bar 8 has an axial bore in which a rod 11 is mounted for sliding movement. At one end the rod 11 is provided with a collar 12 while at the other end it carries a plate 13 in which a pin 14 is adjustably mounted. The pin 14 extends through a hole in the projection 10*a* of the over-arm and lies in the path of the crosshead 7 of the pick-up.

Figures 5, 6, 7, 8:
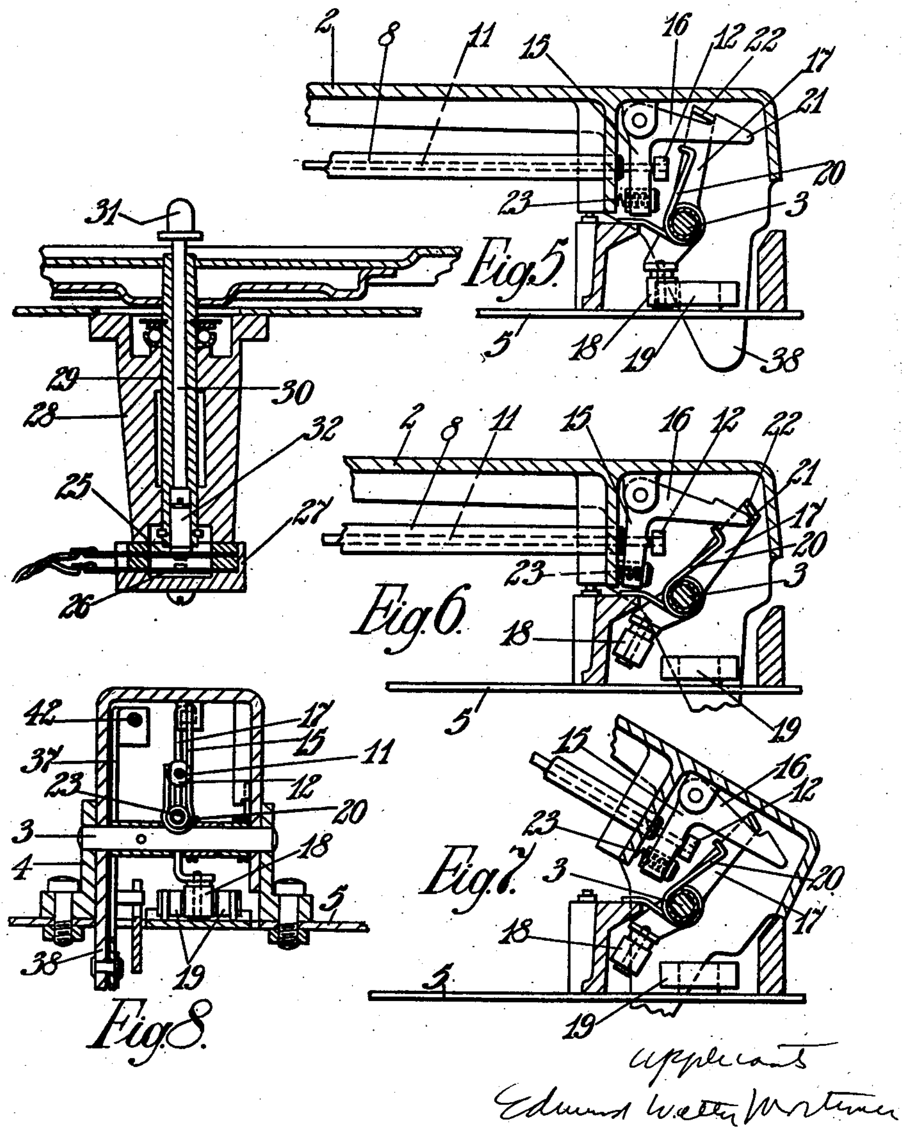
Figure 6 is a similar view with the trip lever released and the starting switch open.
Figure 7 is a detail view showing the re-engagement of the trip lever with the switch lever.
Figure 8 is a cross section taken through the pivot pin of the over-arm.

The collar 12 is adapted to co-operate with an arm 15 of a trip lever 16 pivotally mounted on the over-arm. The trip lever 16 operates to hold a pivoted switch arm 17 in the "on" position in which the contact 18 engages the spring contacts 19 (see Figure 5). Release of the arm 17 by the trip lever 16 allows the spring 20 to move the switch arm 17 to the "off" position (see Figure 6). The spring contacts 19 are mounted on the motor plate.

The release movement of the trip lever 16 is effected by the pick-up crosshead 7 engaging the pin 14 and causing an axial movement of the rod 11 which through the collar 12 pivots the trip lever 16.

The re-engagement of the trip lever 16 with the switch arm 17 is effected by raising the over-arm 2 whereupon the nose 21 of the trip lever passes the surface 22 of the switch arm. The trip lever 16 is held in engagement with the switch arm by the spring 23. The switch contacts 19 are connected in series with a supplementary switch adapted to be operated by the placing of a record on the turntable 24.

The supplementary switch comprises a pair of spring contacts 25, 26 which are mounted in a housing 27 located at the base of the turntable spindle housing or bearing 28. Extending through the spindle 29 is a rod 30 having a flanged cap 31 for engaging the hole in a record. At its lower end the rod 30 is provided with an insulating switch plug 32. When a record is placed in position on the turntable it engages the flange of the cap 31 and presses the rod 30 downwardly causing the upper spring contact 25 to flex and contact the lower spring contact 26. By this arrangement the closing of switch 19 by lowering of the over-arm will not start the motor unless the contacts 25 and 26 are closed by the presence of a record on the turntable.

Figures 3, 4:
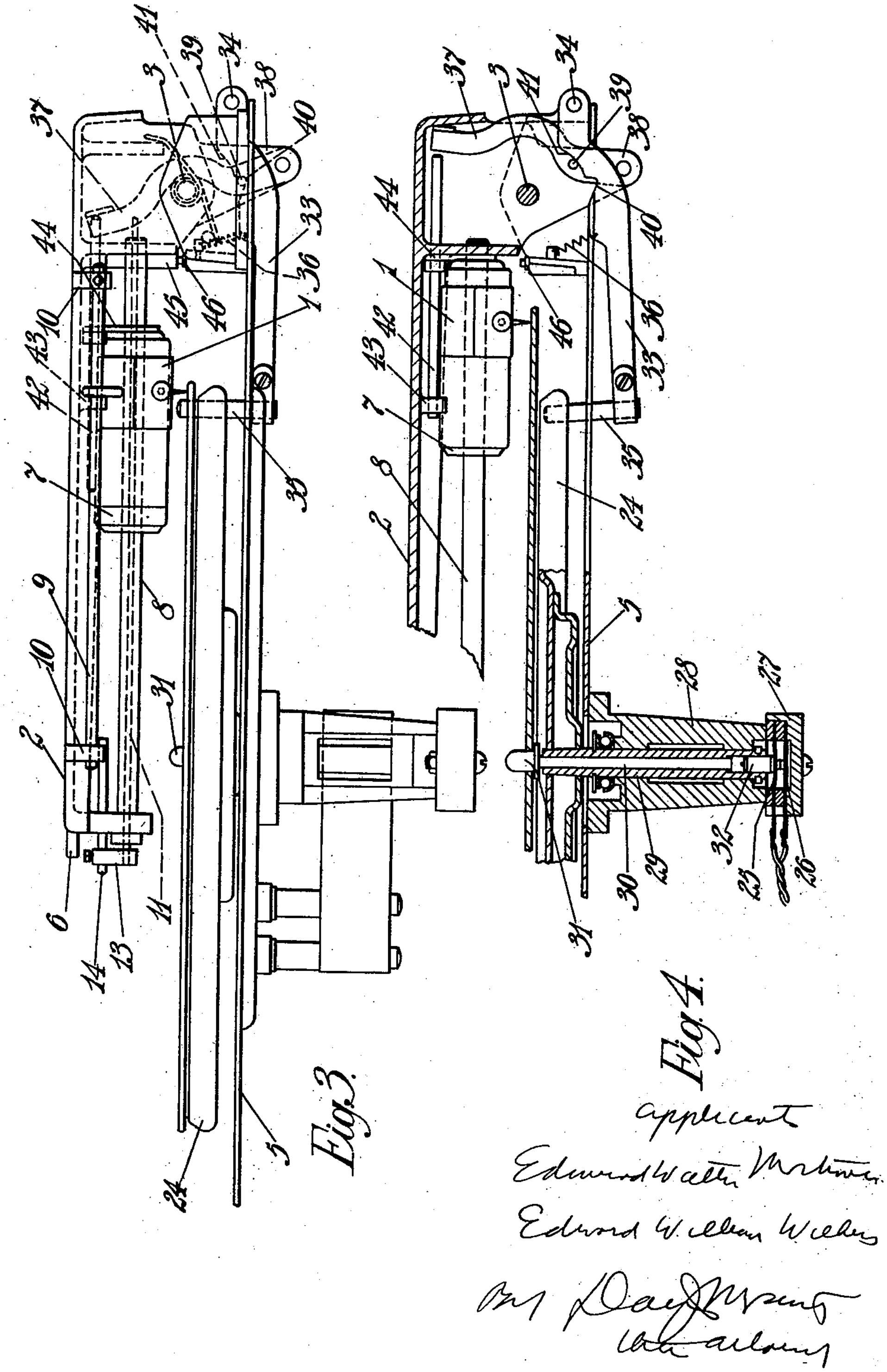

When the over-arm 2 is raised at the end of playing a record the pick-up 1 will slide by gravity until it is stopped by the projection 10. During such return movement the pick-up is supported by the rod 9. The position to which the pick-up returns corresponds to the position for playing a 12'' record as shown in Figure 4.

Selecting means are provided by which the pick-up is allowed to remain in the 12'' position or is moved to a position for playing a 10'' record. These selecting means are controlled by the size of the record placed on the turntable and comprise a selecting lever 33 pivotally mounted at 34 on the bracket 4. The lever 33 carries a plunger 35 which is located in a position such that it may contact the lower surface of a 12'' record but not a 10'' record. The lever 33 is moved upwardly by a spring 36. Such movement is controlled by a control lever 37 pivotally mounted on an extension 38 of the over-arm 2. This lever 37 carries a pin 39 which is adapted to engage in a recess 40 in the selector lever 33 when a 10'' record is in position (see Figure 3) or a surface 41 when a 12'' record is in position.

Assuming a 12'' record is on the turntable (see Figure 4) the engagement of the plunger 35 with the record causes the selector lever 33 to be depressed, so that the pin 39 will engage with the cam surface 41 instead of the recess 40. Consequently when the over-arm 2 is lowered by the action of the lid the pin 39 will be accommodated by the surface 41 and there will be no pivotal movement of the control lever 37. The pick-up 1 will therefore remain in the position conforming to the commencement of the 12'' record groove. When the pin 39 engages the surface 41 the selector lever 33 will be pivoted downwardly to move the plunger 35 out of contact with the record.

On the other hand when a 10'' record is in position on the turntable (see Figure 3) the selector lever 33 remains in its upper position so that when the over-arm 2 is lowered the pin 39 on the control lever 37 engages in the recess 40 and functioning as a fulcrum for the lever 37 causes such lever to pivot. This pivoting of the lever brings its upper end into contact with a push rod 42 mounted for axial movement in brackets 43 in the over-arm 2. This push rod carries a plate 44 against which the crosshead 7 of the pick-up is adapted to abut. The pivotal movement of the control lever 37, through the push rod 42 and plate 44 will move the pick-up to the position conforming to the commencement of a 10'' record groove.

When the over-arm is in its lowered position a part 45 thereon abuts against an adjustable stop 46, carried by the bracket 4.

In operation, the over-arm being raised, a record (say a 10'' record) is placed on the turntable 24. This causes the pin 30 to move downwardly under the weight of the record to close the supplementary switch 25, 26. As the over-arm 2 is pivoted downwardly by a closing of the cabinet lid the contact 18 is moved across the contacts 19 so that the motor is started. At the same time by the engagement of the pin 39 in the recess 40 the control lever 37 is pivoted causing the push rod 42 and plate 44 to set the pick-up in the correct position. At the end of the playing of the record when the needle enters the run-out or stopping groove the pick-up crosshead 7 engages the pin 14 moving the rod 11 and operating the trip lever 16 whereby the starting switch 19 is opened.

When the over-arm is raised the pick-up runs back under gravity to the position corresponding to the 12″ record and the trip lever 16 engages the switch arm 17 and holds it in position for closing the switch 19 when the over-arm is again lowered. In its return movement the pick-up is supported by the rod 9, the position of which however is such that there is no contact with the pick-up during the playing movement.

When a 12″ record is placed on the turntable 24, the supplementary switch is closed and the selector lever 33 depressed. On lowering the over-arm 2 the switch 19 is closed and the motor started. By the depression of the selector lever the control lever does not function so that the pick-up remains set for a 12″ record. The selector lever is further depressed by the pin 39 to remove the plunger 35 from contact with the record.

At the end of playing the record the trip lever 16 is actuated to release the switch arm and the motor cut out. When the over-arm is raised and the 12″ record removed the selector lever rises so that the pin 39 is engaged in the recess 40. Subsequent actuation of the parts will depend on the size of record placed on the turntable.

It will be noted from Figure 1 that the path of the needle across the record conforms to a radius of the record to which the bar 8 is parallel, so that true tangential tracking is maintained.

Moreover when the cabinet is closed without a record being in position on the turntable, owing to the supplementary switch being open, the motor will not be started in spite of the closing of the starting switch.

Instead of the lug 6 and complementary means on the cabinet, the raising of the over-arm 2 may be effected by spring means, lowering being effected by a part of the cabinet lid engaging the upper surface of the over-arm.

Figure 9:
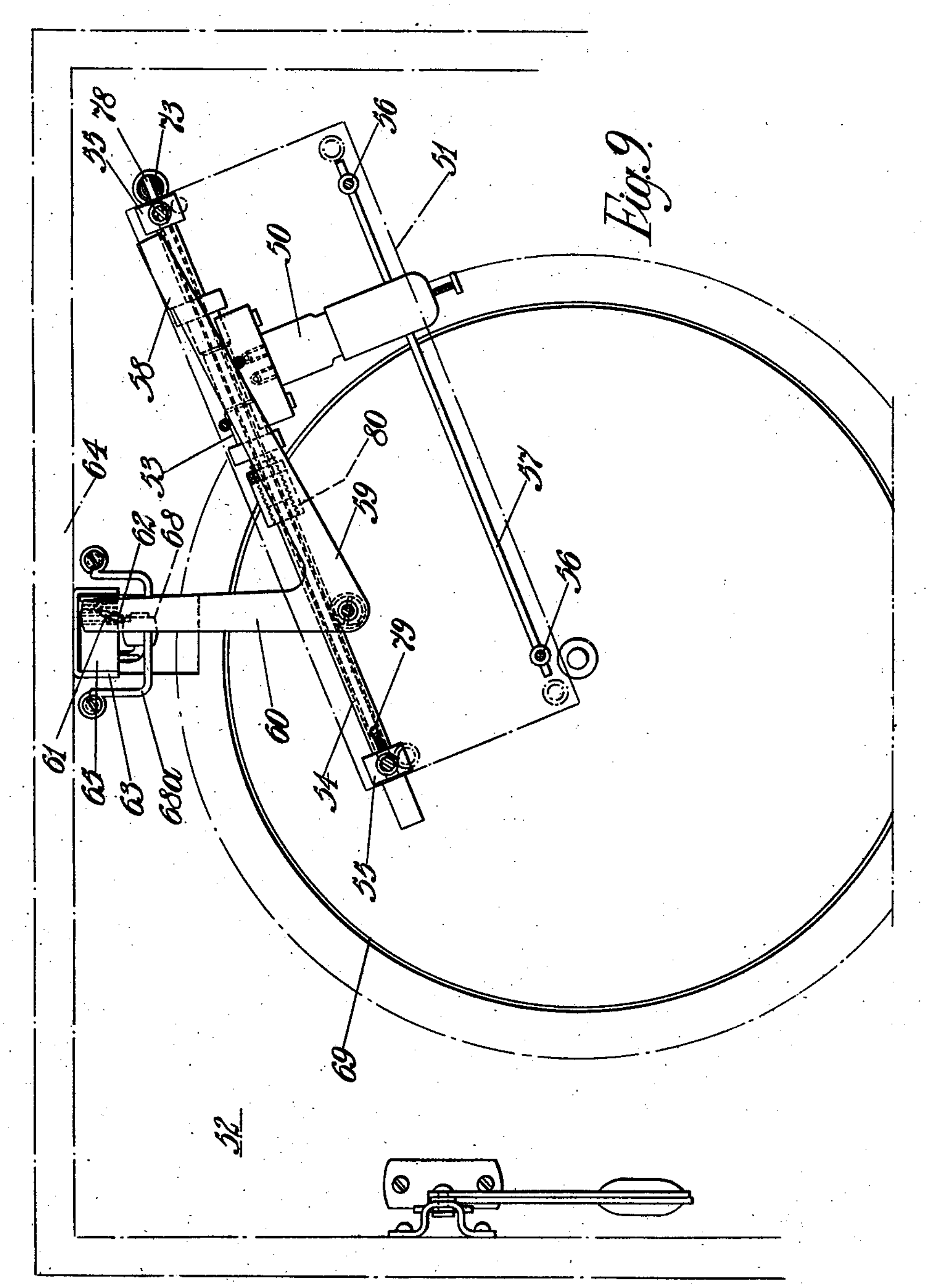
Figure 9 is a plan of a modification in which the pick-up and control means are mounted directly upon the lid of a cabinet.
Figures 10, 11, 12, 13:
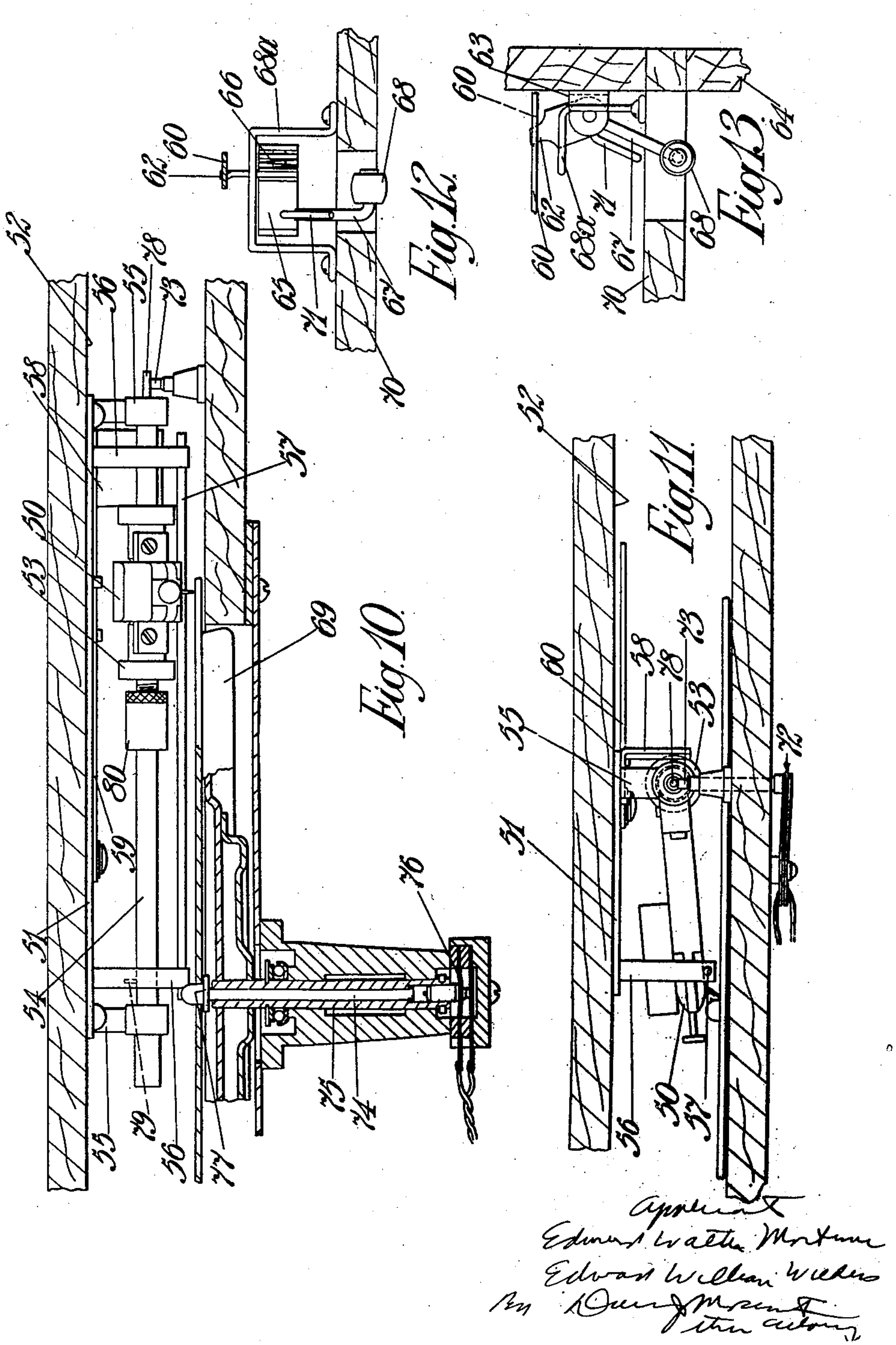
Figure 10 is an elevation partly in section on line 10—10 of Figure 9.
Figure 11 is an end elevation looking in the direction of arrow A, Figure 9.
Figure 12 is a front elevation of a selector control means.
Figure 13 is an end elevation of the selector control.

In carrying the invention into effect according to a modification in which the pick-up and control mechanism is mounted directly upon the cabinet lid, the pick-up unit 50 (see Figure 9) is carried by a plate 51 which is secured to the inner surface of the lid 52 by screws or otherwise. The pick-up is mounted upon a crosshead or carriage 53 which moves along a tracking bar 54. This bar is carried at its ends in a pair of posts 55 secured to the plate 51. The position of the tracking bar 54 is such that the path of the stylus is along a radius of the record.

The mounting of the carriage 53 on the tracking bar 54 is by ball bearings so that its movement is substantially frictionless.

Also mounted upon the plate by means of posts 56 is a supporting rod 57 which is arranged parallel to the tracking bar, which rod supports the free end of the pick-up 50 when the lid 52 is raised. During the playing of a record the pick-up is free from contact with the rod 57.

The position of the tracking bar 54 is arranged at an angle relatively to the hinging edge of the lid so that when the lid 52 is raised the pick-up 50 will automatically move along the bar under the action of gravity to return to the starting position.

A resetting stop 58 is provided for limiting the return movement of the pick-up, and for the purpose of playing either 10″ or 12″ records the stop is mounted upon one arm 59 of a bell-crank lever which is pivotally mounted upon the plate 51. The other arm 60 projects toward the rear edge of the lid and is provided with a cam slot 61 into which a trigger arm 62 projects. This trigger arm 62 is pivotally mounted upon a bearing member or fitting 63 secured to the wall 64 of the lid and frictionally engages a sleeve 65 rotatably mounted on the bearing, a spring 66 being provided for giving the desired frictional grip. The sleeve 65 carries a radial arm 67 having a roller 68 on its free end, such arm projecting toward the turntable 69.

When the lid 52 is open the roller 68 is spaced from the turntable and the length of the arm 67 is such that the roller will overlie the outer margin of a 12″ record, but not a 10″ record, the arrangement being such that when the lid is moved to its closed position the roller 68 will engage the 12″ record and cause a rotary movement of the sleeve 65 which is imparted to the trigger 62 to effect a displacement of the bell-crank lever 59, 60 and the stop 58 and so release the pick-up carriage 53 whereby the pick-up automatically moves to the 12″ position.

The roller arm 67 lies below a rail 68*a* fixed on the motor board 70 and a second arm 71 on the sleeve is adapted to engage the top of the rail, after the release action of the stop 58, to raise the roller from the record. The frictional grip between the trigger 62 and the sleeve 65 permits relative movement or lost motion between the parts. When playing a 10″ record the roller arm 67 moves down into an opening or recess in the motor board so that there is no release of the setting stop.

The automatic starting of the motor is effected by a spring controlled starting switch 72 which is mounted on the motor board, said switch having a plunger 73 which is adapted to be engaged to close the switch by a part of the mechanism secured to the lid.

In order to prevent switching in the motor in the absence of a record on the turntable, a second switch is provided in series with the starting switch. This second switch is adapted to be operated against the action of a spring by the weight of the record. The switch is provided with an actuating plunger 74 extending through the turntable spindle 75 and seated at its lower end on one spring contact 76 of the switch. The plunger is provided with a flange 77 on which the record seats to press it downwardly and close the switch.

For the purpose of opening the motor circuit at the end of the playing of the record, the starting switch 72 is operated by a displaceable rod 78 which is slidable within an axial bore in the tracking bar 54. This rod 78 extends to the upper end of the tracking bar where it is provided with a transverse pin 79 passing through a slot in the tracking bar. At the end of the playing of the record the pick-up carriage 53 is adapted to engage the pin 79 and move the displaceable rod 78 out of contact with the plunger 73 of the starting switch and thus open the switch and stop the motor. On raising the lid and the pick-up carriage 53 returning, the displaceable rod 78 returns under spring action to its position for actuating the starting switch. For adjustment purposes, the pick-up carriage 53 is provided with an adjustable end stop 80 for engaging the transverse pin.

The pick-up 50 may be of any suitable type and conveniently may comprise a piezo crystal pick-up which is plugged into an insulator block secured on the carriage 53.

In operation, the lid being raised causes the pick-up carriage 53 to move by gravity into contact with the setting stop 58.

On placing a 10" record on the turntable 69 the second switch is closed. The lid is then lowered to the closed position, bringing the stylus on to the record at the starting position. This action lowers the supporting rod from contact with the pick-up. At the same time the starting switch 72 is closed and the motor drives the turntable.

When the stylus or needle moves into the run-out groove the stop 80 on the carriage 53 engages the transverse pin 79 and the starting switch is opened, cutting out the motor.

On raising the lid the pick-up 50 is lifted off the record and the carriage 53 runs down the tracking bar 54 returning the pick-up to the starting position, where the carriage engages the resetting stop 58. Removal of the record from the turntable opens the second switch.

When playing a 12" record the above operations are carried out and in addition the trigger 62 is released by engagement of the roller 68 on the arm 67 with the record to set the pick-up at the 12" position.

We claim:

1. In a phonograph unit enclosed within a cabinet having a hinging lid, a turntable for mounting playing records of more than one size, a motor drive for said turntable, a hinging arm mounted adjacent the turntable, means operatively connecting said hinging arm with the hinging lid at an angle relative to the hinging edge of the hinging lid of the cabinet and a pickup slidably mounted on said hinging arm for reciprocation thereon; said hinging arm being mounted in parallelism with said turntable and said pickup being mounted in initial playing position for contact with the entering groove of the record on said turntable and movement toward the center thereof when the hinging lid of the cabinet is closed and said hinging arm and said pickup being angularly displaceable on said hinging arm away from said turntable and the record thereon and said pickup being displaceable by gravity away from the center of said record toward initial playing position when the hinging lid of the cabinet is opened; stop means slidably mounted on said hinging arm for movement between two positions, said stop means in one position being abuttable by said pickup during the movement of said pickup by gravity when the hinged lid of the cabinet is opened; thereby determining the initial playing position of said pickup for the one size of record, irrespective of the size of the last-played record on the turntable; record measuring means pivotally mounted for movement normal to said turntable and the record carried thereby, said measuring means being biased to extend beyond the plane of said turntable and the record thereon only when a record smaller than the one size of record is disposed on said turntable, stop positioning means operatively connected between said stop means and said record measuring means, said stop positioning means being actuatable by said measuring means upon closing of the hinging lid of the cabinet only when the record on the turntable is of a size smaller than the one size of record for displacing said stop means and thereby said pickup against gravity to an initial playing position other than that determined for the one size of record upon the opening of the hinging lid.

2. A phonograph unit adapted for playing records as claimed in claim 1, wherein said measuring means comprising a selecting lever pivoted on the hinging arm and having a plunger adapted to engage the under surfaces of a 12" record, a control lever pivoted on the hinging arm and adapted to engage a push rod mounted for reciprocation on the hinging arm and having the stop means with which the pickup is adapted to abut, said selecting lever having a recess into which a pin on the control lever engages when a 10" record is on the turntable, whereby on lowering the hinging arm the control lever pivots about said pin and moves the push rod and sets the pickup to the 10" position.

EDMUND WALTER MORTIMER.
EDWARD WILLIAM WILKINS.

References Cited in the file of this patent

UNITED STATES PATENTS

| Number | Name | Date |
|---|---|---|
| 1,429,839 | Boswell | Sept. 19, 1922 |
| 1,454,504 | Burch | May 8, 1923 |
| 1,711,666 | Adams | May 7, 1929 |
| 2,113,401 | Goldsmith | Apr. 5, 1938 |
| 2,166,986 | Dally | July 25, 1939 |
| 2,219,504 | Krause | Oct. 22, 1940 |
| 2,316,174 | Kurzen | Apr. 13, 1943 |
| 2,552,757 | Adler et al. | May 15, 1951 |
| 2,556,421 | Gee | June 12, 1951 |